United States Patent Office 3,394,100
Patented July 23, 1968

3,394,100
METHOD OF DISPERSING FILLERS IN
ETHYLENE/ALPHA-OLEFIN
Luigi Falcone and Luigi Torti, Ferrara, Italy, assignors to Montecatini Edison S.p.A., Milan, Italy, a corporation of Italy
No Drawing. Filed July 24, 1962, Ser. No. 212,112
Claims priority, application Italy, July 27, 1961, 13,892/61
10 Claims. (Cl. 260—41)

ABSTRACT OF THE DISCLOSURE

Preparation of vulcanized ethylene/alpha-olefin copolymer, having high mechanical properties and electrical resistivity, by (1) homogeneously mixing into the unvulcanized copolymer a white mineral filler (alkaline earth metal compound or silica) and a dispersion promoter (carboxylic acid, furfural, or derivative thereof), (2) masticating at about 200°–300° C., (3) cooling, (4) adding S and an organic peroxide, and (5) vulcanizing at about 110°–220° C.

---

The present invention relates to a process for preparing vulcanized products having improved mechanical properties and a high electric resistivity from saturated amorphous copolymers of ethylene with alpha-olefins, e.g., propylene or butene, in the presence, if desired, of a compound capable of neutralizing the acidity of fillers and/or vulcanization accelerators which are present.

Saturated amorphous copolymers of ethylene with alpha-olefins exhibit all the properties of substances generally known as "rubber," but they differ from unsaturated rubbery products in so far as vulcanization is concerned, since such saturated copolymers cannot be crosslinked by traditional ingredients, namely sulfur and accelerators.

These copolymers, on the contrary, can be vulcanized by vulcanization methods involving the use of organic peroxides in the presence of small amounts of sulfur.

Saturated copolymers of ethylene with alpha-olefins exhibit very valuable characteristics, some of which depend on their paraffinic nature. The vulcanized products offer very good resistance to thermal aging and to weathering, exhibit very good stability with respect to ozone, and show a good resistance to light. Such products also have excellent electric properties as measured by insulation constant, dielectric constant, and dielectric losses.

A characteristic of such amorphous copolymers of ethylene with alpha-olefins is that they do not crystallize under stretching. Accordingly, vulcanized products having high tensile strength can be obtained only in the presence of reinforcing fillers.

It is therefore necessary to prepare a mix containing copolymer and a filler having a good processability, which mix is capable of producing an elastic reinforced vulcanized product having a high insulating capacity. Such vulcanized products can be used, for example, as dielectric materials for the insulation of metallic conductors.

From the point of view of electric insulation, some mineral fillers are particularly advantageous due to their intrinsic electric properties, the desirable processability they impart to the mix and, in some cases, the economic advantages they offer. Such fillers include oxides; e.g., iron, aluminum, silicon or titanium oxides; hydroxides, e.g., aluminum or silicon hydroxides; carbonates, e.g., calcium, barium, zinc or magnesium carbonates; silicates, e.g., zinc, calcium, magnesium or aluminum silicates; lithopone; and barium sulfate.

It has been observed that with respect to certain of the aforementioned fillers, more particularly those known as "acid fillers" such as some kaolins and silicas, vulcanization with organic peroxides is severely impaired by the negative influence on the peroxide which is exerted by the filler. Therefore, recourse must be had to the use of particular types of organic peroxides not influenced by such fillers, or to the addition of substances which neutralize the influence of the filler on the peroxide. Suitable neutralizers include nitrogen-containing quinone-type compounds (p-benzoquinone dioxime, O-O-dibenzoyl-p-benzoquinonedioxime, p-nitrosophenol) together with peroxide and sulfur, or certain basic organic and/or inorganic ingredients which can be incorporated with the filler-polymer mix at appropriate elevated temperatures.

The vulcanized products thus obtained however are inadequately reinforced, (i.e., will exhibit a rather low elastic modulus and tensile strength in certain applications), do not vulcanize in the presence of steam, and generally exhibit low values for electric resistivity.

When a good dispersion of the filler in the mix is obtained, there is an improvement in the mechanical properties but not in the electric characteristics.

It is an object of the present invention to obtain homogeneous mixes from which vulcanized products having both high mechanical and electrical properties can be obtained.

In accordance with one aspect of our invention, the aforementioned copolymer is homogeneously mixed with a white mineral filler and a dispersion promoter, along with, if desired, a neutralizer for the filler acidity, and the mix thus obtained is subjected to a thermo-mechanical treatment, then cooled and, after addition of vulcanizing agents, is vulcanized, thereby obtaining a vulcanized article having high mechanical properties and a high electric resistivity.

It has surprisingly been found that vulcanized articles with optimum mechanical and electric characteristics can be obtained only by contemporaneously observing three specific precautions, namely:

(a) The choice of a suitable filler (white mineral filler), (b) Mixing this filler with the copolymer and a dispersion promoter, (c) Thermo-mechanical treatment of these components in the absence of vulcanizing agents.

The addition of small amounts of dispersion promoter to a mix containing the copolymer, the mineral filler, and also the vulcanizing ingredients (sulfur and peroxide) results in a vulcanized product having good elastic properties and good reinforcing characteristics. This improvement in the elastic and mechanical properties of the vulcanized products is to be contrasted with the electric insulation characteristics which are in fact only slightly higher than those obtainable by processes known heretofore. Accordingly, to obtain the benefits of our invention, the vulcanizing ingredients must not be added until after the copolymer, filler, and dispersion promoter have been subjected to thermo-mechanical treatment.

Moreover, it has been observed that by carrying out the vulcanization in the presence of steam, there occurs a worsening in the characteristics of the final vulcanized products with the results being similar to those normally obtained in the absence of a dispersion promoter, e.g., maleic anhydride. These experiments lead us to conclude that reinforcing action (mechanical characteristic) and dispersion of the filler (electric properties) are not necessarily related to one another.

Usually a good dispersion of the filler can be obtained in an internal mixer at a sufficiently high temperature. However, it has been observed that such dispersion is not stable and that the filler tends to flocculate in the subsequent heating during vulcanization. In the production of insulating sheaths for electric cables there has often been observed a considerable decrease in insulating properties as compared with those of the crude starting product. A method of obtaining a good dispersion of white fillers comprises incorporating in the mixes, in addition to the vulcanizing agents, also from about 1 to 30% of a zinc or lead soap of a fatty acid with more than 5 carbon atoms. Good characteristics are obtained, but vulcanization in the presence of acid fillers may be deleteriously affected as shown by poor mechanical characteristics of the vulcanized products.

By preparing the filler-polymer mix by the process of the present invention in the presence of a dispersion promoter in an internal mixer and subjecting the mix to a thermo-mechanical treatment at a temperature of from about 200 to 300° C., there is no difference between the insulating characteristics of the crude mix and those of the vulcanized mix.

It is as though in the presence of the dispersion promoter, when the mixes are subjected to a thermal pre-treatment at 200–300° C., the dispersion of the filler becomes irreversible.

Moreover, the process is also applicable to extruded products vulcanized in steam, since both electric and mechanical characteristics of the vulcanized products are not influenced by the vulcanization, even if carried out with this technique.

The copolymer used in the process of the invention should desirably have a content of at least 35 mole percent ethylene and a molecular weight of from about 40,000 to 600,000, and preferably from about 60,000 to 300,000. The white mineral filler is desirably an alkaline-earth metal carbonate or sulfate, or silica, or natural or artificial complex silicates, and preferably is a kaolin, clay, talc, calcium carbonate, silica or barium sulfate. According to a particular feature of the invention, the dispersion promoter is selected from the group consisting of:

(1) Saturated or unsaturated aliphatic dicarboxylic acids containing less than five crabon atoms in the principal chain (including tartaric acid);

(2) Anhydrides, esters or salts of such acids;

(3) Saturated or unsaturated aliphatic monocarboxylic acids containing less than four carbon atoms in the principal chain;

(4) anhydrides, esters, or salts of said acids;

(5) Furfural, furfuryl alcohol, furoic acid, and derivatives thereof.

Such promoters may be introduced as such into the mixtures as for example in the case of maleic acid, fumaric acid, maleic anhydride, succinic acid, malonic acid, oxalic acid, acetic acid, formic acid, acetic anhydride, ethyl acrylate, diethyl malonate, basic lead maleate and the like; or in the form of their "precursors" or of compounds which through the effect of the temperature corresponding to the thermal pretreatment and/or in the presence of the used mineral fillers, may, for example by dehydration, decarboxylation and the like, form products belonging to the class described; this is, for example, the case of citric acid, aconitic acid, malic acid, tricarballylic acid, trioxymethylene, etc.

The amount of promoter added to the mix is desirably from about 0.1 to 15 parts, and preferably from about 0.2 to 10 parts by weight per 100 parts of filler.

The thermal treatment is desirably carried out at from about 200–300° C. contemporaneously with a mechanical homogenization in a roll mixer or in a Banbury mixer.

After this critical treatment, sulfur and peroxide (vulcanizing agents) are added to the mix (0.3 to 1.5 gram atom of sulfur, and preferably 1 gram atom of sulfur, per mole of peroxide, and 0.1 to 10 parts by weight of peroxide per 100 parts of polymer).

The vulcanization is then desirably carried out at a temperature of from about 110° to 220° C., and preferably from about 140° to 180° C.

Finally it has also been observed that, in order to obtain greater cross-linking, the organic peroxide can conveniently be protected against the action of the acid additive by the addition of small amounts of a metal oxide (e.g., MgO, ZnO, CaO, PbO, etc.).

Of course, when the peroxide is of a type which is particularly sensitive to the action of acids, such as dicumyl peroxide, the amount of metal oxide to be added will be considerably higher than the amount needed with peroxides which are not very sensitive to acids, such as tetrachlorinated di-tertiary-butylperoxide.

The invention will now be described with reference to the following illustrative examples.

EXAMPLE 1

In a 50-liter internal mixer a mix "M" having the following composition is prepared:

| | Parts by weight |
|---|---|
| Copolymer | 100 |
| Calcined kaolin | 100 |

An ethylene-propylene copolymer containing 50 moles of ethylene and 50 moles of propylene and having a Mooney viscosity ML (1+4, 100° C.) of 45 is used. (Equivalent results may be obtained using an ethylene-butene copolymer containing 50 moles of ethylene and 50 moles of butene and having a similar Mooney viscosity.)

In a roll mixer a mix consisting of the following components is prepared:

| | Parts by weight |
|---|---|
| The mix "M" | 200 |
| ZnO | 2 |
| Maleic anhydride | 5 |

The mix is subjected to a thermo-mechanical treatment (warm mastication) for 10 minutes at 230° C.

After this treatment the mixture is left to cool and is admixed in the cold in a roll mixer with the vulcanization agents consisting of peroxide and sulfur, thus obtaining a complete mix having the following composition:

| | | Parts by weight |
|---|---|---|
| Mix "M" | {calcined kaolin / copolymer} | 100 |
| ZnO | | 2 |
| Maleic anhydride | | 5 |
| Tetrachlorinated di-tertiary-butylperoxide | | 3.4 |
| Sulfur | | 0.4 |

With this final mix the following articles were prepared:

(1) Unipolar cable (in which the conductor has a section of 1 mm.² and the insulating lining has a thickness of 1 mm.) obtained by extrusion with the extruder head heated to 100° C. and with an extrusion rate of 50 m./minute, and successive continuous vulcanization with saturated steam at 12 atmospheres and at the rate of 50 m./minute.

On a series of pieces of the cable thus obtained there was determined an insulation constant $K_i$ of 20,000 megohm kilometers (MΩkm.), defined by the following formula $$Ki = \frac{R \times L}{\log \frac{D}{d} \times 1000}$$

in which

R=resistance in megohms
L=length of the cable pieces in meters
d=diameter of the conductor
D=outer diameter of the cable (2) Discs having a thickness of 0.7 mm. and a diameter of 300 mm. vulcanized in a press at 165° C. for 50 minutes, on which the following values were determined according to ASTM D-149-59.

Maximum voltage tolerated (kv.) _____ 30
Max. electric field tolerated kv./mm. _____ 35

(3) Discs having a thickness of 2 mm. and a diameter of 52.5 mm., vulcanized in a press at 165° C. for 50 minutes. These discs, after suitable drying under vacuum and careful initial weighing, were immersed into a water bath at 100° C. After 7 days they were removed from the bath, dried and weighed again. The water absorption was 11 mg./cm.² of exposed surface.

(4) Ordinary specimens obtained by vulcanization in a press at 165° C. for 50 minutes, on which the following mechanical characteristics were determined:

Tensile strength _____kg./cm.²__ 63
Elongation at break _____percent__ 390
Modulus at 300% _____kg./cm.²__ 60
Residual elongation _____percent__ 8.5
Tear resistance _____kg./cm__ 36

*Control test*

(a) In a 50-liter internal mixer there was prepared the above mix M. From this mix a unipolar cable was manufactured as in (1). Several pieces of crude cable, with a length of 10 cm., were conditioned in water at 60° C. for 48 hours. The insulation constant Ki (average of various measurements) was 5,000 MΩkm.

(b) The above pieces of crude cable were subjected to a thermal treatment at 170° C. for 30 minutes and were then conditioned in water at 60° C. for 48 hours. The insulation constant Ki was 0.01 MΩkm.; this showed the existence of a destructive effect of the temperature upon the resistivity of the mix.

(c) A mix having the following composition was prepared:

| | Parts |
|---|---|
| Mix M | ¹ 200 |
| ZnO | 1 |
| Diphenylguanidine | 1 |
| Sulfur | 0.4 |
| Tetrachlorinated di-tertiary-butylperoxide | 3.4 |

¹ M=mix of Example 1.

The metal oxide and the organic base, corrective agents normally used in the vulcanization of mixes containing acid fillers, were added in a roll mixer. The vulcanizing agents (peroxide and sulfur) were also incorporated in a mixer.

With this mix a cable similar to that reported under (1) was extruded using the same operative conditions.

Continuous vulcanization was carried out with saturated steam at 12 atmospheres at the rate of 50 m./minute.

The insulation constant was 0.01 MΩkm.

This demonstrated that, in the absence of promoter and thermal treatment, the electrical characteristics are poor.

(2') With the same mix, discs having a thickness of 0.7 mm. and a diameter of 300 mm. (similar to those reported in 2) were molded in a press at 165° for 50 minutes. The measurements carried out according to ASTM D-149-59 gave the following results:

Max. voltage tolerated _____kv__ 11
Max. electric field tolerated _____kv./mm__ 12.5

(3') Again with the same mix, small discs similar to those reported in (3), (diameter 52.5 mm., thickness 2 mm.) were molded in a press at 165° for 50 minutes and then subjected to the absorption test described in (3). After 7 days in the bath, the specimens were removed, dried and weighed, showing a water absorption of 6 mg./cm.².

(d) A mix having the following composition was prepared:

| | Parts |
|---|---|
| Mix M | ¹ 200 |
| ZnO | 10 |
| Stearic acid | 5 |
| Sulfur | 0.4 |
| Tetrachlorinated di-tertiary-butylperoxide | 3.4 |

¹ Mix M of Example 1.

With this mix 500 m. of electric cable was made under the conditions reported in (1). The insulation constant was 1000 MΩkm.

There is an improvement, as compared with (c) resulting from the presence of a dispersant such as stearic acid.

(2") The tests carried out on discs having a thickness of 0.7 mm. and a diameter of 300 mm. obtained from the preceding mix, as reported in (2) and (2') gave the following results:

Max. voltage tolerated _____kv__ 25
Max. electric field tolerated _____kv./mm__ 29.9

(3") The tests carried out on discs having a thickness of 2 mm. and a diameter of 52.5 mm., obtained from the above mix as described in (3) and (3'), showed a water absorption of 3 mg./cm.².

(e) A mix having the following composition was prepared:

| | Parts |
|---|---|
| Mix M | ¹ 200 |
| ZnO | 2 |
| Maleic anhydride | 5 |
| Sulfur | 0.4 |
| Tetrachlorinated ditertiary-butylperoxide | 3.4 |

¹ Mix M according to Example 1.

This mix was prepared in a roll mixer. The insulation constant, determined on a cable as described in (1), is 400 MΩkm. This value however has a low reproducibility. This shows that by replacing stearic acid with maleic anhydride (a promoter according to the invention) but in the absence of thermal treatment, the desired improvements are not obtained.

EXAMPLE 2

With the same formulations of Example 1, the following mixes were prepared for determining the relative mechanical characteristics:

TABLE 1

| | A | B | C | D | E |
|---|---|---|---|---|---|
| Mix M | 200 | 200 | 200 | 200 | 200 |
| ZnO | | 1 | 10 | 2 | 2 |
| Diphenylguanidine | | 1 | | | |
| Stearic acid | | | 5 | | |
| Sulfur | 0.4 | 0.4 | 0.4 | 0.4 | 0.4 |
| Tetrachloroditertiary-butyl-peroxide | 3.4 | 3.4 | 3.4 | 3.4 | 3.4 |
| Maleic anhydride | | | | 5 | 5 |

Mixes A, B, C, D and E were prepared in a roll mixer. The mix E was subjected to the thermal treatment according to the invention as reported in Example 1, i.e., before the addition of the vulcanization agents.

Mixes A, B, C, D and E were vulcanized in a press and in steam at the temperature (165° C.) and for the same time (50 minutes).

Mechanical tests carried out according to ASTM D–412–51 gave the following results:

The Mooney viscosity of the crude mix is only 25. This assures good workability, even with reduced amounts of filler, which make it possible to obtain very high electric insulation values.

The preceding examples were intended mainly to il-

TABLE 2

|  | A | | B | | C | | D | | E | |
|---|---|---|---|---|---|---|---|---|---|---|
|  | Press | Steam | Press | Steam | Press | Steam | Press | Steam | Press | Steam |
| Tensile strength, kg./cm.$^2$ | 39 | 30 | 43 | 36 | 35 | 30 | 70 | 40 | 75 | 65 |
| Elongation at break, Percent | 1,250 | 1,500 | 600 | 700 | 750 | 800 | 450 | 550 | 400 | 500 |
| Modulus at 300%, kg./cm.$^2$ | 17 | 15 | 33 | 20 | 14 | 14 | 60 | 27 | 70 | 58 |
| Residual elongation, Percent (1) | 39 | 45 | 11 | 16 | 16 | 20 | 9 | 17 | 9 | 10 |
| Tear strength, kg./cm. | 23 | 20 | 25 | 20 | 20 | 22 | 40 |  | 42 |  |

(1) After elongation at 200% for 1 hour and reading after 1 minute.

EXAMPLE 3

| | Parts |
|---|---|
| Ethylene-propylene copolymer (50:50 molar ratio), Mooney viscosity ML (1+4, 100° C.)=20 | 100 |
| Calcined kaolin | 50 |
| ZnO | 2 |
| Maleic anhydride | 5 |

The mix was carried out in a laboratory internal mixer. The mix (in the absence of vulcanizing agents) was then subjected to thermo-mechanical treatment as described in Example 1.

After this treatment the mix was cooled and vulcanizing agents consisting of 3.4 parts of tetrachlorinated ditertiary-butyl peroxide and 0.4 part of sulfur were added to the cold mix in a roll mixer. A unipolar cable (cross section of the conductor=12.5 mm.$^2$, thickness of the sheath=5 mm.) was then extruded and vulcanized continuously with saturated steam at 12 atmospheres at the rate of 50 m./minute.

This cable was subjected to various tests in order to determine the insulation constant, the dielectric rigidity and the water absorption.

| Dielectric constant Ki | MΩkm. | 100,000 |
|---|---|---|
| Dielectric rigidity | kv./mm. | 40,000 |
| Water absorption | mg./cm.$^2$ | 3 |

The relative mechanical characteristics, determined on specimens prepared from products vulcanized in a press at 165° C. for 50 minutes were as follows:

| Tensile strength | kg./cm.$^2$ | 55 |
|---|---|---|
| Elongation at break | percent | 550 |
| Modulus at 300% | kg./cm.$^2$ | 30 |
| Residual elongation | percent | 8 |
| Tear resistance | kg./cm. | 25 | lustrate the improved electrical characteristics of the vulcanized products obtained according to the present invention.

Further examples are reported hereinbelow to illustrate the favorable effects upon mechanical characteristics (reinforcing) and shows other formulations within the scope of the invention, and particularly shows the importance of the thermal pretreatment in the preparation of the mixes before incorporating the vulcanizing agents. The effect of varying the amount of promoter having an acid character is also shown.

EXAMPLE 4

This example shows the effect of the amount of promoter (maleic anhydride) upon the characteristics of the vulcanized products in absence of thermal pretreatment. The results are shown in Table 3.

TABLE 3

| | 1 | 2 | 3 | 4 | 5 | 6 | 7 |
|---|---|---|---|---|---|---|---|
| Ethylene-propylene copolymer (50:50 molar ratio) | 100 | 100 | 100 | 100 | 100 | 100 | 100 |
| Calcined kaolin | 100 | 100 | 100 | 100 | 100 | 100 | 100 |
| PbO | 2 | 2 | 2 | 2 | 2 | 2 | 2 |
| Sulfur | 0.4 | 0.4 | 0.4 | 0.4 | 0.4 | 0.4 | 0.4 |
| Tetrachlorinated ditertiarybutylperoxide | 3.4 | 3.4 | 3.4 | 3.4 | 3.4 | 3.4 | 3.4 |
| Maleic anhydride | | 0.5 | 1 | 3 | 5 | 7 | 10 |
| Tensile strength, kg./cm.$^2$ | 54 | 56 | 63 | 71 | 78 | 71 | 47 |
| Elongation at break, percent | 660 | 650 | 580 | 400 | 450 | 410 | 560 |
| Modulus at 300%, kg./cm.$^2$ | 31 | 42 | 50 | 66 | 70 | 60 | 40 |
| Residual elongation, percent | 12.5 | 9 | 10 | 9.5 | 10 | 18 | 28 |
| Tear resistance, kg./cm. | 20 | 29 | 36 | 37 | 36 | 34 | 32 |

EXAMPLE 5

This example shows the effect of the amount of metal oxide (ZnO) upon cross-linking in the presence of maleic anhydride, in the absence of thermal pretreatment.

| Mix No. | 1 | 2 | 3 | 4 | 5 |
|---|---|---|---|---|---|
| Copolymer | 100 | 100 | 100 | 100 | 100 |
| Calcined kaolin | 100 | 100 | 100 | 100 | 100 |
| Maleic anhydride | 5 | 5 | 5 | 5 | 5 |
| Tetrachlorinated ditertiarybutylperoxide | 3.4 | 3.4 | 3.4 | 3.4 | 3.4 |
| Sulfur | 0.4 | 0.4 | 0.4 | 0.4 | 0.4 |
| ZnO | 0 | 1 | 2 | 3 | 4 |
| Mechanical characteristics: | | | | | |
| Tensile strength, kg./cm.$^2$ | 56 | 68 | 78 | 66 | 61 |
| Elongation at break, percent | 580 | 450 | 440 | 470 | 490 |
| Modulus at 300%, kg./cm.$^2$ | 46 | 59 | 66 | 60 | 55 |
| Residual elongation, percent | 14 | 9.5 | 9 | 8.5 | 8.5 |
| Tear strength, kg./cm.$^2$ | 40 | 34 | 39 | 32 | 30 |

EXAMPLE 6

This example shows the effect of variations in the amount of maleic acid, used as promoter, on the characteristics of the vulcanized products, without thermal pretreatment.

| Mix No. | 1 | 2 | 3 |
|---|---|---|---|
| Ethylene-propylene copolymer | 100 | 100 | 100 |
| Calcined kaolin | 100 | 100 | 100 |
| Tetrachlorinated di-tertiary butyl peroxide | 3.4 | 3.4 | 3.4 |
| ZnO | 2 | 2 | 2 |
| Sulfur | 0.4 | 0.4 | 0.4 |
| Maleic acid | 0.5 | 1 | 3 |
| Products vulcanized in a press at 165° C. for 50 minutes—mechanical characteristics: | | | |
| Tensile strength, kg./cm.$^2$ | 48 | 50 | 57 |
| Elongation at break, percent | 660 | 590 | 480 |
| Modulus at 300%, kg./cm.$^2$ | 38 | 45 | 50 |
| Residual elongation, percent | 10 | 10 | 10 |
| Tear strength, kg./cm. | 30 | 33 | 35 |

EXAMPLE 7

Articles obtained from mixtures consisting of copolymer and calcinated clay which had been pretreated thermally at 200° C. during 15 minutes in the presence of various promoters, have been prepared by vulcanization at 165° C. during 50 minutes. Both mechanical characteristics and the insulation constant are reported in the following table.

EXAMPLE 8

The results of the measurements made on articles vulcanized at 165° C. for 50 minutes and obtained with a maleic acid promoter with different white fillers, are reported in the following table. The influence of thermal pretreatment at 200° C. for 15 minutes on the mechanical and electrical characteristics is shown.

|  | Without promoter and without thermal treatment | Ethyl-acrylate | Formic acid | Oxalic acid | Malonic acid | Succinic acid | Malic acid | Tartaric acid | Maleic acid | Fumaric acid | Itaconic acid | Citric acid |
|---|---|---|---|---|---|---|---|---|---|---|---|---|
| Composition: | | | | | | | | | | | | |
| Ethylene-propylene copolymer | 100 | 100 | 100 | 100 | 100 | 100 | 100 | 100 | 100 | 100 | 100 | 100 |
| Whitetex | 100 | 100 | 100 | 100 | 100 | 100 | 100 | 100 | 100 | 100 | 100 | 100 |
| Promoter | | 5 | 1.98 | 6.1 | 4.5 | 5 | 6.3 | 7.13 | 5 | 5 | 6.2 | 10 |
| ZnO | 2 | 2 | 2 | 2 | 2 | 2 | 2 | 2 | 2 | 2 | 2 | 2 |
| Sulphur | 0.4 | 0.4 | 0.4 | 0.4 | 0.4 | 0.4 | 0.4 | 0.4 | 0.4 | 0.4 | 0.4 | 0.4 |
| Tetrachlorinated ditert. butyl peroxide | 3.4 | 3.4 | 3.4 | 3.4 | 3.4 | 3.4 | 3.4 | 3.4 | 3.4 | 3.4 | 3.4 | 3.4 |
| Tensile strength, kg./cm.$^2$ | 45 | 63±2 | 60 | 58 | 60 | 58 | 70 | 76 | 73 | 70 | 72 | 56 |
| Elongation at break, percent | 600 | 480 | 370 | 420 | 440 | 500 | 400 | 490 | 380 | 420 | 510 | 600 |
| Elongation modulus at 300%, kg./cm.$^2$ | 30 | 59 | 58 | 54 | 54 | 52 | 65 | 68 | 71 | 65 | 64 | 49 |
| Elongation modulus at 100%, kg./cm.$^2$ | | | | | | | | | | | | |
| Residual elongation at 200% | 14 | 8.5 | 8.5 | 8.5 | 11 | 11 | 8.5 | 9 | 10.5 | 10 | 10 | 12 |
| Tear strength, kg./cm | 25 | 42±1 | 35 | 33 | 38 | 34 | 40 | 44 | 46 | 44 | 45 | 41 |
| Isolation constant | 0.001 | 3,550 | 300 | 150 | 728 | 446 | 1,000 | 800 | 4,800 | 228 | 2,470 | 1,000 |

|  | Diethyl malonate | Diethyl malonate | Furfurol | Furfurylic | Basic lead maleate | Acetic anhydride | Trioxymethylene | Furoic acid | Zinc maleate |
|---|---|---|---|---|---|---|---|---|---|
| Composition: | | | | | | | | | |
| Ethylene-propylene copolymer | 100 | 100 | 100 | 100 | 100 | 100 | 100 | 100 | 100 |
| Whitetex | 100 | 100 | 100 | 100 | 100 | 100 | 100 | 100 | 100 |
| Promoter | 7 | 6.4 | 5 | 5 | 5 | 4.5 | 4 | 5 | 7.5 |
| ZnO | 2 | 2 | 2 | 2 | 2 | 2 | 2 | 2 | 2 |
| Sulphur | 0.4 | 0.4 | 0.4 | 0.4 | 0.4 | 0.4 | 0.4 | 0.4 | 0.4 |
| Tetrachlorinated ditert. buty peroxide | 3.4 | 3.4 | 3.4 | 3.4 | 3.4 | 3.4 | 3.4 | 3.4 | 3.4 |
| Tensile strength, kg./cm.$^2$ | 60 | 60 | 70 | 78 | 56±1 | 56 | 50±2 | 39 | 81 |
| Elongation at break, percent | 600 | 500 | 400 | 350 | 515 | 430 | 520 | 640 | 300 |
| Elongation modulus at 300%, kg./cm.$^2$ | 43 | 53 | 63 | 65 | 51 | 51 | 42 | 28 | |
| Elongation modulus at 100%, kg./cm.$^2$ | | | | | | | | | |
| Residual elongation at 200% | 10 | 10.5 | 9 | 7.5 | 12 | 9.5 | 9 | 12.5 | 32 |
| Tear strength, kg./cm | 27 | 39 | 35 | 33 | 38 | 31 | 31 | 25 | 8.5 |
| Insulation constant | 2,000 | 1,900 | 1,000 | 800 | 100 | 1,000 | 10 | 100 | 42 / 4,000 |

Fixed components: Ethylene-propylene copolymer (50:50 molar), 100 parts; ML (1+4) 100° C., 45; Sulfur, 0.4; Tetrachlorinated ditertiary butyl peroxide, 3.4.
Vulcanization time, 50'; vulcanization temperature, 165° C.

| Filler (parts per 100 parts of copolymer) | Promoter | Thermal Treatment | Tensile Strength, kg./cm.$^2$ | Elongation at break, percent | Modulus at 300%, kg./cm.$^2$ | Residual elongation, percent | Tear Resistance, kg./cm. | ISO hardness | M.L. | Garvey Die | Ki |
|---|---|---|---|---|---|---|---|---|---|---|---|
| Durosil 40 | Maleic acid 4, ZnO 2. | 200° C.; 15' | 92 | 600 | 46 | 10.5 | 40 | 51 | 75 | 12.5 | 56,600 |
| Do | do | | 113 | 810 | 24 | 16.5 | 28 | 60.5 | 90 | 8.5 | 0.001 |
| Aerosil 40 | Maleic acid 5, ZnO 2. | 200° C.; 15' | 136 | 580 | 57 | 20 | 51 | | | | 20,000 |
| Do | do | | 177 | 900 | 22 | 35 | 47 | 72.5 | | 12.5 | 0.001 |
| Cab-O-Sil 40 | do | 200° C.; 15' | 140 | 500 | 65 | 18 | 45 | | | | 18,300 |
| Do | do | | 186 | 900 | 20 | 32.5 | 62 | 75 | | 12 | 0.001 |
| Socal V$_1$ 100 | do | 200° C.; 15' | 64 | 430 | 58 | 10 | 40 | 57 | 60 | 13.5 | 10,224 |
| Do | do | | 49 | 680 | 30 | 11 | 25 | 64 | 100 | 13.5 | 0.001 |
| Talco 150 | Maleic acid 7.5, ZnO 2. | 200° C.; 15' | 47 | 410 | 47 | 12 | 45 | 60 | 50 | 9 | 5,308 |
| Do | do | | 44 | 680 | 28 | 18 | 31 | 66 | 72 | 5 | 0.001 |
| BaSO$_4$ 150 | do | 200° C.; 15' | 80 | 540 | 58 | 9.5 | 42 | 52 | 55 | 10.5 | 5,000 |
| Do | do | | 41 | 660 | 25 | 14 | 22 | 68.5 | 78 | 9 | 0.001 |
| Whitetex 70, Durosil 20. | Maleic acid 5, ZnO 2. | 200 °C.; 15' | 75 | 410 | 69 | 9 | 42 | 57 | 67 | 12 | 15,000 |
| Do | do | | 52 | 510 | 45 | 10 | 32 | 63 | 96 | 9.5 | 0.001 |
| Do | do | 200° C.; 15' | 75 | 580 | 56 | 14 | 47 | 55.5 | 66 | 13.5 | 14,978 |
| Do | do | | 87 | 800 | 35 | 16.5 | 34 | 68 | 111 | 10.5 | 0.001 |
| Whitetex 70, Socal V$_1$ 30. | do | 200° C.; 15' | 67 | 370 | 64 | 10 | 42 | 57 | 55 | 10.5 | 6,000 |
| Do | do | | 42 | 520 | 37 | 12.5 | 28 | 63 | 90 | 8.5 | 0.001 |
| Whitetex 70, BaSO$_4$ 50. | do | 200° C.; 15' | 72 | 440 | 65 | 10 | 44 | 54 | 55 | 11.5 | 7,328 |
| Do | do | | 46 | 460 | 43 | 12.5 | 29 | 67 | 85 | 7.5 | 0.001 |
| Whitetex 70, Lithopone 50. | do | 200° C.; 15' | 70 | 460 | 61 | 10 | 44 | 54 | 55 | 11.5 | 7,286 |
| Do | do | | 43 | 530 | 37 | 11 | 29 | 65 | 82 | 9.5 | 0.001 |

Durosil, Hydrated silic acid; Cab-O-Sil, SiCl$_4$ pyrolysis silica; Socal, CaCO$_3$; Whitetex, washed and calcinated clay; Aerosil, SiCl$_4$ pyrolysis silica; Lithopone, ZnS-BaSO$^4$ (30–70).
The ISO hardness is measured according to ASTM standard D 1415-56T.
ML indicates the Mooney viscosity ML (1+4) at 100° C.
Garvey Die: see Ind. Eng. Chemistry, Vol. 34, No. 11, November 1942, page 1309.

Variations can, of course, be made without departing from the spirit of our invention.

Having thus described our invention, what we desire to secure and hereby claim by Letters Patent is:

1. A process for preparing a vulcanized product having high mechanical characteristics and a high electric resistivity, said process comprising mixing a saturated amorphous copolymer selected from the group consisting of ethylene-propylene and ethylene-butene copolymers containing at least 35 mole percent of ethylene and having a molecular weight of from about 40,000 to 600,000, with a white mineral filler selected from the group consisting of alkaline earth metal carbonates, alkaline earth metal sulfates, silica, and alkaline earth metal silicates, and with a dispersion promoter selected from the group consisting of aliphatic dicarboxylic acids containing less than 5 carbon atoms in the aliphatic chain which includes both carboxyl carbon atoms and a total of up to about 10 carbon atoms, anhydrides, esters and salts of such acids, aliphatic monocarboxylic acids containing less than 4 carbon atoms in the aliphatic chain which includes the carboxyl carbon atom and a total of up to about 9 carbon atoms, anhydrides, esters and salts of such acids, furfural, furfuryl alcohol, furoic acid, tartaric acid, citric acid, aconitic acid, malic acid, tricarballylic acid and trioxymethylene, to thereby form a homogeneous mixture, masticating said mixture at a temperature of from about 200 to 300° C., cooling, adding sulfur and an organic peroxide thereto, and vulcanizing at a temperature of from about 110 to 200° C., to thereby obtain a product having high mechanical properties and a high electric resistivity.

2. The process of claim 1 wherein the initial mixing is carried out in the presence of a metal oxide neutralizer for said filler.

3. The process of claim 1, wherein the amount of dispersion promoter is from about 0.1 to 15 parts by weight per 100 parts of filler.

4. The process of claim 1 wherein the amount of promoter is from about 0.2 to 10 parts by weight per 100 parts of filler.

5. The process of claim 1, wherein said mastication is carried out with mechanical homogenization in a mixer.

6. The process of claim 1, wherein the sulfur is added in an amount of from about 0.3 to 1.5 g atom per mole of peroxide.

7. The process of claim 6, wherein the sulfur and the peroxide are added in equimolar amounts.

8. The process of claim 1, wherein the amount of peroxide is from about 0.1 to 10 parts by weight per 100 parts of polymer.

9. The process of claim 1 wherein the vulcanization is carried out at a temperature of from about 140° to 180° C.

10. The method of claim 1 wherein there is employed from about 50 to 150 parts of said filler per 100 parts of copolymer.

References Cited

UNITED STATES PATENTS

| | | | |
|---|---|---|---|
| 3,173,903 | 3/1965 | Lukach et al. | 260—88.2 |
| 2,655,492 | 10/1953 | Young et al. | 260—41 |
| 2,692,870 | 10/1954 | Pechukas | 260—78 |
| 3,012,016 | 12/1961 | Kirk et al. | 260—41 |

FOREIGN PATENTS 231,048   10/1960   Australia.

JULIUS FROME, *Primary Examiner.*

J. H. DERRINGTON, *Assistant Examiner.*

UNITED STATES PATENT OFFICE
CERTIFICATE OF CORRECTION

Patent No. 3,394,100                          July 23, 1968

Luigi Falcone et al.

It is certified that error appears in the above identified patent and that said Letters Patent are hereby corrected as shown below:

Columns 7 and 8, the table for Example 5, first column, last line thereof, "Tear strength, kg./cm.$^2$" should read -- Tear strength, kg./cm. --. Column 9, line 4, "calcinated" should read -- calcined --. Columns 9 and 10, the second half of the table for Example 7, the heading for the first column thereof, "Diethyl malonate" should read -- Cinnamic acid --; same table, the heading to the third column thereof, "Furfurol" should read -- Furfural --; same table, the heading to the fourth column thereof, "Furfurylic" should read -- Furfuryl alcohol --; same columns, the table for Example 8, the heading for the next to the last column thereof, "Garvey Die" should read -- % Swell-at Garvey Die --. Column 11, line 30, "110 to 200° C." should read -- 110 to 220° C. --.

Signed and sealed this 13th day of January 1970.

(SEAL)
Attest:

EDWARD M. FLETCHER, JR.
Attesting Officer

WILLIAM E. SCHUYLER, JR.
Commissioner of Patents